US008288486B2

(12) United States Patent
Garcia et al.

(10) Patent No.: US 8,288,486 B2
(45) Date of Patent: Oct. 16, 2012

(54) HIGH PH PROCESS RESISTANT COATING FOR METAL FOOD CONTAINERS

(75) Inventors: Armi G. Garcia, Muntinlupa (PH); Benedick M. Francisco, Binan Laguna (PH)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 13/271,482

(22) Filed: Oct. 12, 2011

(65) Prior Publication Data

US 2012/0046389 A1     Feb. 23, 2012

Related U.S. Application Data

(63) Continuation of application No. PCT/US2010/030200, filed on Apr. 7, 2010.

(60) Provisional application No. 61/168,654, filed on Apr. 13, 2009.

(51) Int. Cl.
| | |
|---|---|
| *C08L 63/00* | (2006.01) |
| *C08L 67/00* | (2006.01) |
| *A23L 3/00* | (2006.01) |
| *B32B 15/09* | (2006.01) |
| *B32B 15/092* | (2006.01) |

(52) U.S. Cl. ................ 525/528; 525/438; 525/440.02; 525/443; 525/533; 523/100; 523/400

(58) Field of Classification Search ................ 428/34.1, 428/35.7, 413, 418, 480; 523/100, 400; 525/437, 525/438, 440, 441, 443, 523, 528, 533, 440.02
See application file for complete search history.

(56) References Cited

U.S. PATENT DOCUMENTS

| | | | | |
|---|---|---|---|---|
| 3,896,076 | A | * | 7/1975 | Watanabe et al. .............. 523/440 |
| 3,960,979 | A | * | 6/1976 | Khanna ......................... 525/110 |
| 4,018,848 | A | | 4/1977 | Khanna |
| 5,368,945 | A | | 11/1994 | Hardeman et al. |
| 5,739,215 | A | | 4/1998 | Westerhof et al. |
| 2005/0014012 | A1 | | 1/2005 | Stapperfenne et al. |
| 2005/0129847 | A1 | | 6/2005 | Thiebes et al. |
| 2007/0036903 | A1 | | 2/2007 | Mayr et al. |
| 2007/0054140 | A1 | | 3/2007 | Mayr et al. |

FOREIGN PATENT DOCUMENTS

| | | | |
|---|---|---|---|
| EP | 0202405 | | 8/1992 |
| JP | 07113058 A | * | 5/1995 |
| JP | 2001123142 A | * | 5/2001 |
| JP | 2001220541 A | * | 8/2001 |
| WO | 8600630 | | 1/1986 |
| WO | 9832807 | | 7/1998 |
| WO | 0001779 | | 1/2000 |
| WO | 2007062735 | | 6/2007 |

OTHER PUBLICATIONS

Machine translation of JP 07113058 A, provided by the JPO website (no date).*
Dr. Baumbach, "Desmodur VP LS 2078, A new Building Block for Interior Can Coatings with Food Contact", Bayer MaterialScience, Aug. 17, 2007, 11 pages.
Dr. Baumbach, "Desmodur VP LS 2078/1, A new Building Block for Can Coatings with Food Contact", Bayer MaterialScience, Jul. 1, 2008, 5 pages.
Form PCT/ISA/210, Marquis, "International Search Report", PCT/US2010/030200, Jul. 2, 2010, 3 pages.
Form PCT/ISA/237, Marquis, "Written Opinion of the International Searching Authority", PCT/US2010/030200, Jul. 2, 2010, 5 pages.

* cited by examiner

*Primary Examiner* — Michael J Feely
(74) *Attorney, Agent, or Firm* — Stephan P. Williams; Craig K. Leon

(57) ABSTRACT

Disclosed is an improved coating composition for food containers that is resistant to high pH processing environments. The improved coating composition is based upon an epoxy-amino resin coating composition that has been modified with other components to improve its performance in high pH environments balanced with flexibility, formability and abrasion resistance. Typically, the coating composition includes an epoxy resin, an amino resin cross-linking agent, a blocked polyisocyanate and a saturated polyester.

20 Claims, No Drawings

HIGH PH PROCESS RESISTANT COATING FOR METAL FOOD CONTAINERS

CROSS-REFERENCE TO RELATED APPLICATIONS

This application is a continuation of application PCT/US2010/030200 filed on Apr. 7, 2010, which claims priority from application U.S. Ser. No. 61/168,654 filed on Apr. 13, 2009, the disclosures of which are incorporated herein by reference.

FIELD OF THE INVENTION

The present invention is directed to improved coating compositions for metal food containers, particularly where such coating compositions come in contact with high pH retort water (i.e., pH above normal condition of pH 6-8) during the sterilization process. The improved coating composition of the present invention is based upon an epoxy-amino resin system that has been modified with other components to improve its performance in high pH environments.

BACKGROUND OF THE INVENTION

Metal containers for foods and beverages generally have one or more coatings to inhibit contact of the packed product and/or process water or steam onto the metal in order to prevent or minimize corrosion of the metal. Any such corrosion will affect the quality of the packed product or influence the aesthetic appearance of the container that, in long term, will affect the quality of the packed product. In the production of metal containers of this kind, there is often provided metal in the form of sheets or coils that is pre-coated with a suitable coating and which is subsequently processed to obtain the desired container by shaping (such as for three-piece can production) or deformation (such as for deep drawing processes). In producing cans for food and beverages, coatings are required that have no or low toxicity and that are flexible enough to withstand deformations during the can manufacturing process and abrasion/scratches during transportation. Furthermore, filled food cans are often sterilized under application of temperatures up to 135° C. The coating must therefore be sufficiently stable at those temperatures and must be capable of maintaining good adhesion to the surface of the metal.

Various types of coating compositions are well known in the can coating industry. Such coating compositions include epoxy resins, polyester resins, polyvinylchloride (PVC) resins, acrylic resins, and epoxy esters as main resin components. Such coating compositions also include a cross-linking agent such as a phenolic or an amino resin, such as those based upon urea, melamine, benzoguanamine or hexamethoxy methyl melamine, depending on the required application.

For external can coating applications, the most widely used coating systems are generally based upon either an epoxy/phenolic or an epoxy/amino system. Epoxy/phenolic formulations have some disadvantages with respect to color retention on multiple bakes and high pH process resistance. Epoxy/amino resin systems generally have somewhat better process resistance than the epoxy/phenolic systems, but have some disadvantages with respect to flexibility and formability.

The use of blocked polyisocyanates as cross-linkers or modifiers has become increasingly popular because of their performance attributes, particularly with respect to process resistance and flexibility. However, compliance to food regulations is an issue with this particular cross-linker. Typically, the blocked polyisocyanate systems use saturated polyester resin as the main binder. Some such systems may optionally include an amino resin, a phenolic resin or a small amount of epoxy resin. These coatings are generally recommended for use on can exteriors where there is no direct food contact due to the residual content of free blocking agent from the polyisocyanate.

Process resistance is a major requirement for coating compositions used to coat the exterior surfaces of food cans. Process water varies in pH, from neutral (pH 6-8) up to as high as pH 10-12. Process resistance (i.e., ability of the coating to withstand high temperature, high pressure sterilization conditions) is inversely proportional to film flexibility and formability. In other words, if process resistance is improved, it negatively affects the film flexibility/formability and vice versa. This has always been the performance trade-off observed on current external can coating systems. Process resistance also influences the resistance to bi-metallic effect of the can coating. Bi-metallic corrosion occurs when different metals are in contact in the presence of an electrolyte (e.g., EOE ends made of tinplate or electro chromium coated steel (ECCS) with aluminum tabs with retort water as an electrolyte). The coating for this type of application must possess good process resistance to block the flow of current from one metal to the other.

It is an object of the invention to provide a high pH process resistant can coating composition that also exhibits good film flexibility/formability and scuff resistance to withstand the mechanical stresses of can forming. In addition, it is also an object to provide a can coating composition with improved bi-metallic corrosion resistance after processing. It is a further object to provide a can coating composition that complies with FDA 175.300 regulations so that it may also be used as an internal can coating that comes in direct contact with dry food.

SUMMARY OF THE INVENTION

The present invention is directed to a can coating composition that provides excellent high pH performance (i.e., high pH process resistance) while also providing a good balance of film flexibility and formability and scuff resistance.

The coating composition of the present invention comprises a substantial portion of an epoxy resin, an amino resin cross-linking agent, and a small portion of a blocked polyisocyanate and a saturated polyester. Preferably, the blocked polyisocyanate and saturated polyester are present in an amount such that the stoichiometric ratio of OH to NCO is about 1:1.

DETAILED DESCRIPTION OF THE INVENTION

The can coating composition of the present invention typically comprises, by weight (i.e., % by weight of the resin components on a total solid resin weight basis), about 75% to about 95%, preferably about 80% to about 90%, of an epoxy resin; about 4% to about 15%, preferably about 5% to about 10%, of an amino resin cross-linking agent, about 1% to about 3% of a blocked polyisocyanate and about 1% to about 4% of a saturated polyester resin.

The epoxy resin may be any of those epoxy resins currently used to formulate can coating compositions. The preferred epoxy resins are those having an epoxide equivalent weight of about 1350-5500 and having an average value of $n \geq 8$, more preferably $n=8$ to 16 (where n is the degree of polymerization). Such epoxy resins are typically produced from epichlorohydrin and bisphenol A. Preferably, the epoxy resin is a blend (e.g., a 60:40 blend) of at least two high molecular weight epoxy resins in which one epoxy resin has an epoxide equivalent weight of 1350-2000 and the other epoxy resin has an epoxide equivalent weight of 2200-5500. One preferred epoxy resin combination is EPIKOTE® 1007, with epoxy equivalent weight of approximately 1775 and n=9, combined with EPIKOTE® 1009, with epoxy equivalent weight of approximately 3060 and n=12, both epoxies being manufactured by Hexion. Another preferred epoxy resin combination is YD-017WR with epoxy equivalent weight of 1900 and YD-019WR with epoxy equivalent weight of 2800, both manufactured by Kukdo Chemicals.

The epoxy resin is cross-linked with an amino resin cross-linking agent. Typical amino resin cross-linking agents include urea-formaldehyde, melamine formaldehyde, benzoguanamine formaldehyde, and hexamethoxy methyl melamine resin. The amino resin will typically be present in an amount of about 6-10% of the total amount of the epoxy resin and amino resin solids (i.e., the solids ratio of epoxy resin:amino resin is about 94:6 to about 90:10). One preferred amino resin cross-linker is an n-butylated urea formaldehyde resin having an acid value of 0-5 mg KOH/g. Another preferred amino resin cross-linker is an n-butylated benzoguanamine-formaldehyde resin having an acid value of 1-5 mg KOH/g.

The coating composition of the present invention additionally includes, as a critical component, a small amount of a blocked polyisocyanate, such as is disclosed in US 2005/0129847, the disclosure of which is incorporated herein by reference. The blocked polyisocyanate is preferably an FDA 175.300 compliant blocked polyisocyanate, for example one based on isophorone diisocyanate (IPDI), and sold under the trademark DESMODUR® from Bayer. The blocked polyisocyanate is included in an amount of about 1% to 3% by weight of the total resin composition weight.

Polyisocyanates are made from suitable diisocyanates that contain aliphatically, cycloaliphatically, araliphatically and/or aromatically bonded isocyanate groups, e.g. 1,4-diisocyanatobutane, 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane-, 1,3- and 1,4-diisocyanatocyclohexane, 1,3- and 1,4-bis(isocyanatomethyl)-cyclohexane (H12MDI), 1-isocyanato-3,3,5-trimethyl-5-isocyanatomethylcyclo-hexane (isophorone diisocyanate, IPDI), 1-isocyanato-1-methyl-4(3)-isocyan-atomethylcyclohexane (IMCI), 4,4'-diisocyanatodicyclohexylmethane, bis(isocyanatomethyl)-norbornane, 1,3- and 1,4-bis(2-isocyanatoprop-2-yl)-benzene (TMXDI), 2,4- and 2,6-diisocyanatotoluene (TDI), 2,4'- and 4,4'-diisocyanatodiphenylmethane, 1,5-diisocyanatonaphthalene or any desired mixtures of such diisocyanates. The polyisocyanates are preferably polyisocyanates or polyisocyanate mixtures with exclusively aliphatically and/or cycloaliphatically bonded isocyanate groups. Particularly preferred polyisocyanates or polyisocyanate mixtures are those with an isocyanurate structure and/or an iminooxadiazinedione and/or biuret structure based on HDI, IPDI and/or 4,4'-diisocyanatodicyclohexylmethane, or mixtures of these compounds. Very particularly preferred polyisocyanates are those based on IPDI with an isocyanurate structure.

Suitable blocking agents are the compounds reactive towards NCO groups that are known from the state of the art, such as alcohols, lactams, oximes like butanone oxime, phenols, alkyl hydroxybenzoates, pyrazoles and triazoles, and amines, e.g. 1,2,4-triazole, 3,5-dimethyl-1,2,4-triazole, 3,5-dimethylpyrazole, 1H-imidazole, pyrazole, diisopropylamine, acetone oxime, ϵ-caprolactam or any desired mixtures of these blocking agents. It is preferable to use ϵ-caprolactam and aliphatic alcohols having a molecular weight of <100, or mixtures of these compounds. It is very particularly preferable to use ϵ-caprolactam.

The blocked polyisocyanate must be cross-linked with a suitable high molecular weight saturated polyester resin. Suitable polyester resins are described in the above-mentioned published patent application ('847), as well as in US 2007/0054140 and US 2005/0014012, the disclosures of which are incorporated herein by reference. Generally, the polyester resin should be included in an amount such that the stoichiometric ratio of polyester OH to blocked polyisocyanate NCO is about 1:1. Various polyester resins may be included, such as polyesterpolyols, polyacrylatepolyols, polyurethanepolyols, polycarbonatepolyols, polyetherpolyols, polyesterpolyacrylatepolyols and polyurethanepolyacrylatepolyols, polyurethanepolyesterpolyols, polyurethanepolyetherpolyols, polyurethanepolycarbonatepolyols, and polyesterpolycarbonatepolyols, on their own or in mixtures. It is preferable to use polyesterpolyols synthesized from at least one component containing hydroxyl groups and one component containing carboxyl groups. The polyesterpolyols used are preferably synthesized from toxicologically safe constituents, examples being 1,2-propanediol, neopentyl glycol, 1,1,1-trimethylolpropane, adipic acid and maleic anhydride. The polyester resins typically have a molecular weight (Mn) in the range of about 500-10,000 Da, and have a hydroxyl number in the range of about 3-80 mg KOH/g polymer. A preferred polyester resin is DESMOPHEN® hydroxyl-bearing polyester from Bayer with % OH of 1.5-2.5% and OH equivalent weight of 850. The oil-free polyester is added in amount of about 1-4% by weight of total resin solids, preferably at 1:1 OH:NCO ratio with blocked polyisocyanate.

In addition to the above-described key components, the coating composition may additionally include other optional components. For example, it may include an amine neutralized blocked acid catalyst to accelerate the cross-linking reaction, typically in an amount of about 0-2%, preferably about 0.20-0.50% based on the weight of the total resin solids. Optionally, it may include a conventional acid catalyst, such as phosphoric acid, in an amount of about 0-3%. The preferred catalyst is a blocked dodecylbenzene sulfonic acid which complies with FDA 175.300 regulations.

The coating composition may also optionally include a lubricant to aid in forming and fabricating cans without damaging the coating film. The lubricant is typically a micronized wax or wax dispersion having a particle size mean value of about 5-6 microns by laser diffraction analysis. Typical waxes include Carnauba wax, polyethylene wax, Fischer-Tropsch wax or PE/PTFE blend, or a mixture of two or more of such waxes, typically in an amount of about 0-1% of solid wax based on the total weight of the formulation.

The coating composition may optionally include surface modifying additives such as flow agents, anti-foaming agents, etc, in an amount of about 0-2%. Other resins may be included in small amounts as modifying resin, e.g., 0-5% based on total weight of the formulation. Such resins may include low molecular weight epoxies with epoxide equivalent weight of 600-950 such as EPIKOTE® 1002 from Hexion or thermoplastic polyvinyl butyral resin such as MOWITAL® B30H from Kuraray Specialities GmbH.

In order to utilize the coating composition of the present invention to coat cans, or to coat metal sheet stock used to produce cans, the above-described coating composition is dissolved in an organic solvent, preferably a mixture of high boiling organic solvents. Typically, such solvents include high boiling aromatic solvents, glycol ether acetates, alcohols, ketones, glycol ethers and butyl acetate. Generally, the amount of solvent added will be such as to provide a total solids content of about 35% to 45%, preferably about 37% to 39%, by weight of the total formulation.

The coating composition is prepared using any conventional method. The epoxy resins are first dissolved in the organic solvent mixture. The rest of the components are added one at a time with stirring until homogeneous. The coating composition of this invention can be applied by known conventional methods such as using conventional roller or anilox roller at a dry film weight of about 4-8 grams per square meter, more preferably at about 5-7 grams per square meter, and cured at 190°-205° C. for 8-12 minutes peak metal temperature (PMT), preferably at 197°-203° C. for 10 minutes PMT.

Example

External can coating resin compositions were prepared having the formulations set out below. Ex. 1 is a formulation in accordance with the present invention, while Comp. A and Comp. B are comparative examples based on conventional types of epoxy resin coatings.

|  | Weight (g) | | |
| --- | --- | --- | --- |
| Ingredient | Ex. 1 | Comp. A | Comp. B |
| Epikote 1007 | 20.594 | 31.609 | 32.894 |
| Epikote 1009 | 13.732 | | |
| Epikote 1002 | | 3.127 | |
| Amino Resin | 3.940 | 0.211 | 5.749 |
| Desmodur blocked polyisocyanate | 1.000 | | |
| Desmophen polyester | 1.133 | | |
| Phenolic resin | | 4.658 | |
| Catalyst | 0.100 | 0.266 | 0.246 |
| Additives/Lubricant | 0.400 | 0.522 | 0.430 |
| Solvents | 59.101 | 59.607 | 60.681 |
| Total resin solids % | 38.219% | 37.507% | 36.786% |

The above-described formulations were prepared using the following general process. The epoxy resins are completely dissolved in a mixture of organic solvents at high speed (about 1000-1200 rpm) at a temperature of about 50-70° C. The epoxy solution is then cooled to about 35-40° C. to proceed with the addition of the other materials. The other resins, namely the polyester, blocked polyisocyanate, and amino resin are added one at a time with stirring (about 500-600 rpm) until homogeneous. Additional solvent mixture is added while stirring to reduce viscosity and allow better stirring. Wax dispersion is added while stirring and after about 5-10 minutes, followed by the acid catalyst (pre-mixed with solvent), then the remainder of the solvent is added to complete the batch. If any surface modifying agents are used (i.e., leveling additive, defoamer), these are pre-mixed with solvent, then added to the batch while stirring after cooling of the epoxy solution and stirring at high speed for about 5-10 minutes before adding the other materials.

The above formulations were tested for flexibility, formability, abrasion resistance, scratch resistance, high pH process resistance, and bi-metallic resistance. As can be seen from the test results, the formulation of the present invention had a very good balance in all of these properties compared to the other formulations.

| Performance | Ex. 1 | Comp. A | Comp. B |
| --- | --- | --- | --- |
| Flexibility[1] | 82% | 79% | 52% |
| Formability[2] | 3 | 5 | 4 |
| Abrasion Resistance[3] | 6.7 mg | 9.1 mg | 8.4 mg |
| Scratch Resistance[4] | 1000 g | 1200 g | 800 g |
| Process Resistance @ pH 10[5] | 0 | 2 | 0 |
| Process Resistance @ pH 12[5] | 1 | 5 | 1 |
| Bi-metallic Resistance[6] | 2 | 5 | 2 |

[1]wedge-bend test; higher value = better flexibility
[2]square cup with bead after process at pH 12 - 131° C./60 minutes; (0 = best, 5 = worst)
[3]Taber Abraser dust loss method; lower value = better abrasion resistance
[4]Sheen Scratch Test; higher value = better scratch resistance
[5]Flat sheet processed at 131° C./60 min. (0 = best; 5 = worst)
[6]Tinplate sheet with aluminum tab processed at pH 12 - 131° C./ 60 min. (0 = best; 5 = worst)

The invention claimed is:

1. A can coating composition comprising, by weight, based on total solid resin weight, about 75% to about 95% of an epoxy resin, about 4% to about 15% of an amino resin cross-linking agent, about 1% to about 3% of a blocked polyisocyanate and about 1% to about 4% of a saturated polyester.

2. The can coating composition of claim 1, wherein the epoxy resin comprises a blend of at least two high molecular weight epoxy resins in which one epoxy resin has an epoxide equivalent weight of about 1350-2000 and the other epoxy resin has an epoxide equivalent weight of about 2200-5500.

3. The can coating composition of claim 2, wherein the one epoxy resin has an average degree of polymerization (n) of n=9 and the other epoxy resin has an average degree of polymerization (n) of n=12.

4. The can coating composition of claim 3, wherein the weight ratio of the two high molecular weight epoxy resins comprises a 60:40 ratio of the lower molecular weight epoxy resin to the higher molecular weight epoxy resin.

5. The can coating composition of claim 2, wherein the solids weight ratio of the epoxy resin to the amino resin is about 94:6 to about 90:10, wherein the blocked polyisocyanate is based on isophorone diisocyanate (IPDI) and is blocked with ε-caprolactam, wherein the saturated polyester has a molecular weight (Mn) in the range of about 500-10,000 Da and has a hydroxyl number in the range of about 3-80 mg KOH/g, and wherein the saturated polyester and blocked polyisocyanate are present in amounts such that the stoichiometric ratio of polyester OH to blocked polyisocyanate NCO is about 1:1.

6. The can coating composition of claim 5, additionally comprising an organic solvent in an amount such that the composition has a total solids content of about 35% to 45% by weight of the total composition.

7. The can coating composition of claim 6, wherein the amino resin cross-linking agent comprises an n-butylated benzoguanamine-formaldehyde resin having an acid value of about 1-5 mg KOH/g.

8. The can coating composition of claim 1, wherein the epoxy resin is a diglycidyl ether of bisphenol A and epichlorohydrin.

9. The can coating composition of claim 1, wherein the amino resin cross-linking agent comprises an n-butylated urea-formaldehyde resin having an acid value of about 0-5 mg KOH/g.

10. The can coating composition of claim 1, wherein the amino resin cross-linking agent comprises an n-butylated benzoguanamine-formaldehyde resin having an acid value of about 1-5 mg KOH/g.

11. The can coating composition of claim 1, wherein the solids weight ratio of the epoxy resin to the amino resin is about 94:6 to about 90:10.

12. The can coating composition of claim 1 comprising, by weight, based on total solid resin weight, about 80% to 90% of the epoxy resin and about 5% to 10% of the amino resin cross-linking agent.

13. The can coating composition of claim 1, wherein the blocked polyisocyanate is based on isophorone diisocyanate (IPDI).

14. The can coating composition of claim 13, wherein the blocked polyisocyanate is blocked with ε-caprolactam.

15. The can coating composition of claim 1, wherein the saturated polyester has a molecular weight (Mn) in the range of about 500-10,000 Da, and has a hydroxyl number in the range of about 3-80 mg KOH/g.

16. The can coating composition of claim 15, wherein the saturated polyester comprises 1.5-2.5% OH and has an OH equivalent weight of about 850.

17. The can coating composition of claim 1, wherein the saturated polyester and blocked polyisocyanate are present in amounts such that the stoichiometric ratio of polyester OH to blocked polyisocyanate NCO is about 1:1.

18. The can coating composition of claim 1, additionally comprising an organic solvent in an amount such that the composition has a total solids content of about 35% to 45% by weight of the total composition.

19. The can coating composition of claim 1, additionally comprising one or more components selected from a blocked acid catalyst, a lubricant, a flow modifying agent and a foam control agent.

20. The can coating composition of claim 1, wherein all of the components comply with FDA 175.300 regulations.

* * * * *